United States Patent Office 3,565,848
Patented Feb. 23, 1971

3,565,848
PHENOLIC RESIN BINDER COMPOSITION
Junichi Hiroshima, Nobeoka-shi, Japan, assignor to Asahi Yukizai Kogyo Kabushiki Kaisha, Nakanose-machi, Nobeoka-shi, Miyazaki Prefecture, Japan
No Drawing. Filed Apr. 17, 1968, Ser. No. 721,916
Int. Cl. C08g 51/36
U.S. Cl. 260—31.2
17 Claims

ABSTRACT OF THE DISCLOSURE

Properties of a phenolic resin binder composition such as thermal stability, mechanical strength, etc. are improved by incorporating into the composition during its preparation carboxyl groups from a diphenolic acid component, e.g. 4.4-bis (4'-hydroxy phenyl) pentanic acid.

---

This invention relates to phenol formaldehyde resin compositions intended for use as binders, which compositions contain carboxyl groups due to the incorporation of a diphenolic acid and/or metallic salt thereof into the composition.

The compositions of the invention are used as binders for binding fillers or reinforcing agents in synthetic resin products, for example, in binding molding chips, molding powder, laminates, brakes, foundry shells, abrasives (whetstones), and the like. By way of example, the preparation of binders for the production of precision molding shells and abrasive materials such as whetstones are described below.

As is well known, phenol formaldehyde resin (hereinafter abbreviated as "phenolic resin") has an important commercial position as a binder for making precision molding shells and whetstones, especially because of its thermal resistance.

A conventional type of whetstone, the so-called resinoid whetstone, is made of grinding or abrasive grains and a phenolic resin binder. The importance of such whetstones is increasing because of the high thermal resistance and mechanical strength of the whetstones. Nevertheless, there is a need for further improvement in grinding ability, dimensional stability and thermal resistance of whetstones. The conventional type of whetstones employing grinding or abrasive grains and phenolic resin binder has not been able to satisfy such requirements even though trials have been made employing various additives, for example, chlorine.

Phenolic resin binders hold a dominant position as binders for binding sand grains in the production of precision molding shells because of their storage stability, free flowability, and mechanical strength as compared with other thermosetting resins such as urea resins or furan type resins. As is the case with whetstones, further improvement in the properties of the binder is desired, especially, improvements in the storage stability of sand grains under high temperature and high humidity (because the binders are liable to be blockish under such conditions), mechanical strength, setting speed, and in peelback property. Peelback is a phenomenon which makes shell-molding difficult because the molding material comes off of the metal mold during operation. The four above-mentioned properties are closely related to one another, i.e. a phenolic resin having a low softening point is apt to turn blockish, its setting speed is slow, and peelback occurs easily when the resin is used for binding foundry sand, however, it has high mechanical strength. On the other hand, a resin having a high softening point exibits improvements with respect to the properties of storage stability, setting speed, and resistance to peelback, however, it has the defect of low mechanical strength. In spite of considerable efforts to improve the coating method, and use of promoters for setting, lubricants, plasticizers, and regulation of other setting conditions in an effort to satisfy all of the above-mentioned properties; the amount of improvement using conventional types of phenolic resin has now about reached its peak.

It is a principal object of the present invention to solve the aforementioned problems by providing a new phenolic resin binder containing a diphenolic acid component, which binder has improved thermal resistance, mechanical strength, dimensional stability, and storage stability.

Another object of the present invention is to provide a process for the production of an improved phenolic resin binder by incorporating therein carboxyl groups from a diphenolic acid, a metallic salt thereof, or from mixtures of a diphenolic acid and a metallic salt thereof.

This invention is characterized by a phenolic resin binder containing carboxyl groups from a diphenolic acid and/or a metallic salt thereof.

The diphenolic acids useful in carrying out the invention may be represented by the formula

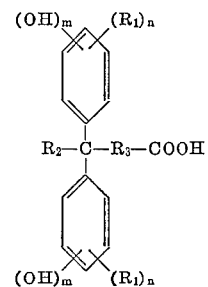

wherein each $m$ is an integer of 1 or 2, $R_1$ is at least one group selected from methylol, alkoxymethyl, lower alkyl having up to about 5 carbon atoms, e.g. methyl, ethyl, etc., and hydrogen, $n$ is an integer of 0–2, $R_2$ is hydrogen or lower alkyl group having up to about 5 carbon atoms, and $R_3$ is an alkylene group having about 1 to 3 carbon atoms.

The diphenolic acids useful in the invention are capable of easily entering into the phenolic resin as a component thereof, and exemplary diphenolic acids include 4.4-bis (4'-hydroxyphenyl) pentanic acid (hereinafter abbreviated as "DPPA") and 4.4-bis (4'-hydroxyphenyl) butyric acid (hereinafter abbreviated as "DPBA"), 4.4-bis (2',4'-dihydroxy phenyl) butyric acid, 4.4-bis (2'-methyl,4'-hydroxy phenyl) butyric acid, and derivatives of these acids falling within the above general formula.

It is well known that DPPA reacts with formaldehyde in the presence of acid or alkali catalyst to form a resin and that the carboxyl group of DPPA may form a metallic salt, however, the binder of this invention in which diphenolic acid and/or a metallic salt thereof exists as a component of phenol resin and its manufacturing process are quite novel.

The ratio of the amount of carboxyl groups to benzene nuclei in the composition of this invention is from 0.5 to 30 mole percent, with from 1 to 10 mole percent being especially preferred. The reaction property of a diphenolic acid of the invention with formaldehyde is substantially the same as that of phenols such as phenol, cresol, xylenol, and resorcinol. However, the diphenolic acid component of the invention is apt to gelate rapidly during the reaction if a large quantity of this component is used. This is the reason why the above-mentioned upper limit on the carboxyl group content was selected. If the content of carboxyl groups is less than the above-mentioned lower limit, the advantages of the invention are reduced.

In order to incorporate carboxyl groups into the binder composition, one suitable procedure is to carry out a condensation reaction involving proper amounts of phenol and formaldehyde (usually added as Formalin) and a diphenolic acid, at a temperature of 80–100° C., stirring the mixture continuously for about 30–120 minutes in the presence of a catalyst, and thereafter eliminating unreacted monomer and water under a reduced pressure.

The ratio of formaldehyde employed to phenols (including both the phenol component and the diphenolic acid component) ranges from about 0.5:1 to 4.0:1 on a mol basis. However, if the amount of the diphenolic acid component is more than about 10 mole percent based on the amount of the phenol component, the amount of formaldehyde used may be somewhat decreased, e.g. by 5–10 percent by weight.

As modifications of the above-described procedure, carboxyl groups may be introduced into the resin composition by any of the following procedures:

By adding the diphenolic acid component (1) during the condensation reaction of phenol and formaldehyde, after the reactants have changed into the emulsion state; (2) at any stage during the dehydration of the phenolic resin; (3) before said dehydration; (4) after the dehydration; (5) by blending during grinding of the dehydrated phenolic resin; and (6) at any stage to a phenol-formaldehyde reaction product which is dissolved by solvent after dehydration.

Catalysts for the condensation reaction include basic compounds such as organic amines, alkalis such as caustic soda and caustic potash, and acids such as hydrochloric acid, sulphuric acid and oxalic acid. The above enumerated catalysts are merely representative, and it will be understood that any catalysts generally used for the production of phenol formaldehyde resins may be employed. Similarly, the mole ratio of phenol to formaldehyde in preparing the phenolic resin may be within the range conventionally employed in the art, and the condensation reaction conditions may also be conventional although the reaction should be carried out mildly when relatively large amounts of the diphenolic acid component are employed. Such conditions are well known to those of ordinary skill in the art and require no further description in this application.

According to an embodiment of the invention in which a metallic salt of a diphenolic acid is incorporated into the phenolic resin; the metallic salt may be added at the beginning of the reaction, during the formation of the phenolic resin, or after the condensation reaction. It is also possible to convert a carboxylic acid group which has been incorporated into the resin composition to the metallic salt after the condensation reaction.

The metals utilized in the metallic salts belong to Groups I, II, III and IV-A of the Periodic Table and include sodium, potassium, calcium, copper, zinc, iron, titanium, nickel, and lead. Said metals may be added in the form of ions having a valence from 1–4, hydroxides of said metals, inorganic acid salts such as carbonates and bicarbonates of said metals, and organic acid salts of the metals, for example, formates and acetates, which are preferably added in an aqueous solution or in an alcohol solution. After adding these substances, the temperature may be increased up to 200° C. while stirring the mixture to promote a smooth formation of salts, and during this process, educed water and acid may be evaporated. If necessary, it is possible to utilize an educed fatty acid as a lubricant by using a metal salt of a long chain aliphatic acid.

As an alternate procedure for the formation of a metallic salt, it is possible to exchange ions between carboxylic acid groups and a metal compound at comparatively low temperature (e.g. below about 100° C.). For instance, after condensing phenol and a diphenolic acid with formaldehyde; a metal salt, oxide or hydroxide may be added to the condensation reaction product as is but preferably in an alcohol solution or in an aqueous solution to carry out ion exchange. Thereafter, the resulting salt is washed. In this case, after forming the acid salt of a metal such as an alkali metal, it is also possible to thereafter double decompose said salt with another metallic compound.

The amount of metal compound or metal ion used is regulated depending upon the desired content of the carboxylic acid salt. The use of lead, copper, zinc, nickel, barium, cobalt and aluminum is particularly preferred in the formation of the acid salts. Formation of the metal containing acid salts can be recognized by the phenomenon that the infrared absorption spectrum due to the vibration at $C=O$ of the carboxyl groups in the neighborhood of 1,700 cm.$^{-1}$ decreases and contra-symmetrical vibration due to $—COO^-$ in the neighborhood of 1,575 cm.$^{-1}$ appears. In this manner, it is also possible to ascertain the amount of remaining carboxyl groups.

The binder composition of this invention is a mixture comprising mainly phenolic resin molecules, each having 2–10 benzene nuclei with a distribution peak nearly in the middle. Depending upon the amount of the diphenolic acid component used and the condensing conditions, e.g. the type of catalyst, reaction temperature and time, and dehydration temperature after the metal source is added, the position and height of such distribution peak can be adjusted whereby a product having comparatively low or high softening point can be made at will.

In accordance with the invention, free carboxylic acid groups may coexist with metallic salts of the carboxylic acid groups. Generally, the ratio of free carboxylic groups to salt groups is between 80:20 and 20:80. When the amount of free carboxylic acid groups is greater than the amount of acid salt groups, for example, when the amount of the former is 50 mole percent more than the amount of the latter, the phenolic resin binder composition is useful for making precision molding shells since the setting speed, mechanical strength, peelback property, block property and the like of the composition are superior to those of prior art phenolic resin binder compositions. When the amount of acid salt groups is greater than the amount of free carboxylic acid groups, for example, when the former is 50 mole percent greater than the latter, setting speed, mechanical strength and block property are improved as compared to prior art compositions.

The compositions of the invention when used as binders for whetstones, exhibit remarkably improved grinding ability, dimensional stability and thermal resistance as compared to prior art whetstones, especially when the compositions of the invention contain a metal salt of the diphenolic acid.

It will be appreciated that the amount of phenolic resin which is used as a binder varies according to the filler employed. For example, about 3 weight percent of the resin composition may be employed to bond silica whereas about 30 weight percent of the resin composition may be employed to bond abrasive grains. However, in both cases, it is important to have the filler coated with the resin composition as uniformly as possible in order for the resin composition to advantageously perform its function. Therefore, wetting of the filler with the binder composition, the flow of binder when heated for molding, and the time of curing (setting) are important points to consider in operation, as will be apparent to those of ordinary skill in the art.

The compositions of the invention may be used in manufacturing abrasive articles following the general techniques known in the art. For instance, the binder of the invention in powder form may be added to abrasive grains moistened with liquid phenolic resin, and this mixture is stirred to coat the surfaces of the abrasive grains. To make a whetstone, the abrasive grains are then compression molded either at normal temperature or at an elevated temperature, and the molded article is thereafter calcined in a furnace at a temperature from about 100° C. to about 300° C.

The invention will be described in further detail in the following illustrative examples which relate to the production of whetstones and precision molding shells.

EXAMPLE I

This example illustrates the preparation of a resin powder useful in the production of a whetstone.

Ten moles of phenol, 1 mole of DPA, 9.4 moles of formaldehyde in the form of a 37% by weight aqueous solution, and 0.2 weight percent of sulfuric acid based on the total amount of phenol and DPA, were mixed, heated, emulsified, and thereafter reacted at 90° C. for one hour. At the time of dehydration, 0.4 mole of lead acetate was added, and the mixture was kept at 130° C. for 30 minutes to complete dehydration. 100 parts of the resulting resinous composition was mixed with 7.5 parts of hexamethylenetetramine, and this mixture was pulverized to make a resin powder having the following properties: flow 30 mm., gelation time 33 seconds, softening point 68° C.

The flow, gelation time and softening point refer to respectively the length of flow of a cylindrical sample of a fixed weight (1 gram) which is allowed to flow on an inclined glass plate (30° C.) in the presence of hexamethylenetetramine of a fixed ratio (7.5% by weight) and at the temperature of 125° C., the time taken for the sample to gelate on a heated plate at 150° C. until no sticky line was observed upon pulling, and lastly, the softening point was determined by the capillary method.

The aforementioned properties of the resin powder indicate that the resin powder is suitable for the production of a whetstone, and a whetstone was prepared following the procedure of Example II below.

DPA: hereinafter stands for the trade name of DPPA produced by S. C. Johnson & Son Inc., U.S.A.

EXAMPLE II

The procedure of Example I was followed but employing DPBA in place of DPA to obtain a metal containing resin composition. This resin had the following properties: flow 32 mm., gelation time 38 seconds, and a softening point of 70° C.

An offset whetstone was made from the following materials:

|  | G. |
|---|---|
| Abrasive grains, alundum 2A #36 | 1,000 |
| Abrasive grains, alundum 2A #46 | 80 |
| Abrasive grains, alundum WA #36 | 200 |
| Creolite | 10 |
| Carbon black | 10 |
| Resin powder of this example | 304 |
| Liquid phenol formaldehyde resin | 118 |

After the alundum and filler were mixed, the liquid phenol formaldehyde resin was added to moisten this mixture, and then the resin powder of this example was admixed therewith. The resultant mixture was molded in a metal mold under a pressure of 100 kg./cm.$^2$ and two sheets of glass cloth with phenolic resin attached to their surfaces were placed in the resulting whetstone. This molded product was baked for 32 hours at a temperature up to 180° C. to make a test whetstone.

For comparison purposes, a reference whetstone was made following the exact procedure described above, except that ordinary phenol formaldehyde resin was used in place of the resin powder of this invention. The property values of the reference resin were as follows: flow 25 mm., gelation time 63 seconds, and a softening point of 95° C.

Tests were conducted upon the whetstones of Examples I and II and upon the reference whetstone, and the results of these tests are tabulated in Table 1 below.

TABLE I

|  | Grinding test (Stainless steel SUS-27 was used) | | | | |
|---|---|---|---|---|---|
|  | Breaking revolution, r.p.m. | Weight of metal removed g. | Abrasion loss of whetstone, g. | Grinding ratio | Rate of operation [1] |
| Whetstone in which the resin of Example I was used | 15,500 | 104.30 | 35.63 | 2.92 | 305.3 |
| Example II was used | 15,500 | 106.41 | 34.20 | 3.11 | 331.1 |
| Reference whetstone | 15,500 | 66.46 | 47.67 | 1.38 | 72.6 |

[1] The rate of operation is the result obtained by dividing the square of the weight of removed metal by the abrasion of whetstone, showing the grinding efficiency of whetstone.

EXAMPLE III

This example illustrates the production of a whetstone for general grinding purposes employing the resin of Example I.

100 grams of abrasive grains, alundum 2A #36, 15.7 grams of the resin powder of Example I, and 5.6 grams of liquid phenol formaldehyde resin were mixed following the same procedure as that of Example II. The resulting mixture was molded at a pressure of 200 kg. and was thereafter baked at 180° C. for 32 hours.

For comparison purposes, a whetstone was made following an identical procedure except that ordinary phenol formaldehyde resin was used in place of the resin powder of Example I. The properties of the reference resin were as follows: flow 35 mm., gelation time 73 seconds, and a softening point of 94° C. Tests conducted upon the whetstone of this example (produced from the resin of Example I), upon a corresponding whetstone produced employing a resin as described in Example II, and upon the reference whetstone are tabulated in Table 2 below.

TABLE 2

|  | Grinding test (Stainless steel SUS-27 was used) | | | | |
|---|---|---|---|---|---|
|  | Flexural strength (kg./cm.²) | Weight of metal removed, g. | Abrasion loss of whetstone, g. | Grinding ratio | Rate of operation |
| Example III—Whetstone in which the resin of Example I was used | 170.8 | 121 | 76 | 1.59 | 193 |
| Whetstone in which the resin of Example II was used | 176.2 | 125 | 80 | 1.56 | 195 |
| Reference whetstone | 166.1 | 112 | 104 | 1.08 | 129 |

EXAMPLE IV

This example illustrates the manufacture of a whetstone for precision grinding.

A resin powder was prepared employing the following materials:

Phenol—15 moles
DPA—1 mole
Formaldehyde (in the form of a 37% aqueous solution)—13.6 moles
Sulfuric acid—1% (based on the weight of phenol and DPA)

This mixture was subjected to a condensation reaction employing the same process as described in Example I. At the time for dehydration, 0.4 mole of lead acetate was added, and the mixture was reacted at 150° C. for 30 minutes, and then cooled. 7.5 parts of hexamethylenetetramine was added to 100 parts of the resin formed by the above-mentioned reaction, and this mixture was pulverized to make a powder. The resin has the following properties: flow 33 mm., gelation time 40 seconds, and a softening point of 70° C.

A whetstone for precision grinding was made employing 100 grams of abrasive grains, whitelundum WA #36, 15.7 grams of the powdered resin of this example, and 5.6 grams of a liquid phenol formaldehyde resin. This mixture was molded following the same method as described in Example II to obtain a whetstone having a measurement of 312 mm$\phi$ by 100 mm., and a test piece for measuring flexual strength. After calcination for 36 hours, changes in height due to flowing, and strength were measured, and are reported in Table 3 below. For reference purposes, corresponding articles were produced employing a formulation in which only ordinary phenol formaldehyde resin was used in place of the resin powder of the invention. The reference resin had properties of flow of 95 mm., gelation time of 90 seconds and a softening point of 80° C. The properties of the reference article are also reported in Table 3.

EXAMPLE V

This example also relates to the production of a whetstone for precision grinding.

A resin powder was prepared using the following materials:

Phenol—15 moles
DPBA—1 mole
Formaldehyde (in the form of a 37% aqueous solution)—13.6 moles
Sulfuric acid—1% (based on the weight of phenol and DPBA)

This mixture was condensed following the method of Example I, and after the product was washed with water, one mole of caustic soda was added. While stirring this mixture at 50° C., 0.5 moles of nickel sulphate in an aqueous solution was added thereto, thoroughly mixed, and the product was water washed and dehydrated. 7.5 parts of hexamethylenetetramine were added to 100 parts of the resin produced as described above to make a powdered resin binder. The resin binder had the following properties: flow 85 mm., gelation time 45 seconds, and a softening point of 73° C. A whetstone for precision grinding was made using this resin powder and following the method of Example IV. The changes in height due to flowing and the strength of this whetstone were measured, and are tabulated in Table 3 below.

TABLE 3

| | Height (percent to measurement at molding time) | Flexural strength, kg./cm.² |
|---|---|---|
| Whetstone in which the resin of Example IV was used | 99.12 | 316 |
| Whetstone in which the resin of Example V was used | 99.18 | 319 |
| Reference whetstone | 97.80 | 302 |

From a consideration of the aforementioned examples, it will be appreciated that a whetstone having excellent grinding ability, as shown in Tables 1 and 2, can be made employing phenolic resin binder compositions of the invention. Such whetstones while having excellent grinding ability show little abrasion loss. This indicates that the binder is highly adhesive, and that the binder has good resistance to heat produced upon grinding.

The dimensional stability shown in Table 3 indicates that the whetstones are most suitable for use in precision grinding. Furthermore, reviewing the properties of the resin binder composition of the invention, it is apparent that properties such as softening point, gelation time, and flow, are much different from those of the conventional type of phenol formaldehyde resin.

EXAMPLE VI

This example relates to the production of a molding shell.

A resin was produced from the following materials:

Phenol—15 moles
DPA—1 mole
Formaldehyde—13.6 moles
Hydrochloric acid—0.2% (based on the combined weight of phenol and DPA)

This mixture was heated to 90° C., held at this temperature for one hour, and after washing the reaction products once with water, 0.4 mole of lead acetate was added. The resultant mixture was heated for 30 minutes with the temperature increased to 180° C. under reduced pressure. 15 parts of hexamethylenetetramine per 100 parts of the reaction product were mixed and pulverized to produce a resin powder. The flow, gelation time, and melting point of the resultant resin were 24 mm., 35 seconds and 79° C., respectively.

The resulting resin was made into a 65 weight percent methanol varnish, and 3 weight percent of this varnish was added to Sanei No. 7 K3 silica according to the sand mixing method described below to make 3 kilograms of resin coated sand grains. In the sand mixing method, sand at about 50° C. and hexamethylenetetramine employed in an amount of 10 weight percent based on the amount of varnish were mixed in a whirl mixer. After 30 seconds, the varnish was added thereto and the mixing was continued for 2 minutes. After removing the lid, the mixing was continued for 90 seconds and 0.1% of calcium stearate based on the weight of the sand was added. The mixing was continued for 30 seconds, and thereafter the mixture was taken out of the mixer. The resin coated sand grains were then formed into a molding shell by known techniques, and properties of the product were determined and are tabulated in Table 4 which follows Example XIV below.

EXAMPLE VII

A resin was prepared from the following materials:

Phenol—15 moles
DPA—1 mole
Formaldehyde—9.4 moles
Oxalic acid—1% (based on the total weight of phenol and DPA)

This mixture was condensed at 97° C. for two and one-half hours. After washing the resultant condensate with water three times, 0.4 mole of lead acetate was added, the mixture was heated to 180° C., and dehydration was carried out under a reduced pressure for 30 minutes. The properties of the resultant resin were as follows: flow 42 mm., gelation time 49 seconds, and a softening point of 82° C.

Thereafter, following the same method as in Example VI, sand was mixed with the resin, and a molding shell was made and tested.

EXAMPLE VIII

Following the method of Example VI, with the exception that DPBA was used in place of DPA, a metal containing resin was obtained having the following properties: flow 40 mm., gelation time 47 seconds, and a softening point of 81° C. A molding shell was formed following the method of Example VI.

EXAMPLE IX

A resin was produced from the following materials:

Phenol—1.5 moles
DPA—0.5 mole
Formaldehyde—13.6 moles
Sulfuric acid—0.2% (based on the weight of phenol and DPA)

These materials were heated to 90° C. and kept at this temperature for one hour. Thereafter, the product was washed with water once, 0.2 mole of zinc stearate was added, and the mixture was heated under a reduced pressure to 180° C. for two hours. The flow, gelation time, and softening point of the thus obtained resin were 98 mm., 54 seconds, and 108° C., respectively. A molding shell was produced following the method of Example VI.

EXAMPLE X

A resin was produced from the following materials:

Phenol—15 moles
Formaldehyde (in the form of a 37% aqueous solution)—13.6 moles
Sulfuric acid—0.2% (based on the weight of phenol)

These reactants were condensed at 98° C. for one hour, and the product was washed with water, and 0.5 mole of zinc salt of DPBA was added thereto, and dehydration was carried out with the temperature being increased up to 150° C. The resultant resin had the following properties: flow 50 mm., a gelation time of 48 seconds, and a softening point of 81° C. The zinc salt of DPBA was made by adding 0.5 mole of zinc acetate per mole of DPBA, and heating this mixture at 150° C. for 30 minutes.

A molding shell was then produced following the procedure of Example VI.

EXAMPLE XI

Employing the same method as in Example X, phenol and formaldehyde were condensed to make Novolak resin, and DPBA was mixed therewith to make a resin containing carboxylic acid groups. The properties of this resin were as follows: flow 55 mm., a gelation time of 50 seconds, and a softening point of 80° C. A molding shell was then produced following the procedure of Example VI.

EXAMPLE XII

The method of Example VI was followed except that 4,4-bis(2',4'-dihydroxyphenyl) butyric acid was substituted for DPBA and 20 moles of phenol were employed. The resin had a flow of 41 mm., of gelation time of 43 seconds, and a softening point of 82° C.

EXAMPLE XIII

The procedure of Example VI was repeated except that 4,4-bis(2'-methyl,4'-hydroxyphenyl) butyric acid was used in place of DPBA. The properties of the resin were a flow of 30 mm., a gelatin of 38 seconds, and a softening point of 81° C.

EXAMPLE XIV 10 moles of phenol, 8.5 moles of formaldehyde, added in the form of a 37% aqueous solution, and 0.2% of hydrochloric acid, based on the weight of phenol, were condensed at 98° C. for one hour. After the reaction mixture was rinsed in water, a hydrated Novolak resin was produced.

DPBA was changed into methylolated DPBA ($R_1$ is —$CH_2OH$) by stirring a mixture of 0.5 moles of DPBA sodium salt, 0.1 mole of formaldehyde (in the form of a 37% aqueous solution) and 0.03 mole of sodium hydroxide, at a temperature of 90° C. for an hour. The liquid produced by this reaction was added to the above produced hydrated Novolak resin. While stirring, 0.55 mole of an aqueous solution of cobalt sulfate was added, and after stirring for 10 minutes the reaction product was rinsed in water. The resulting resin contained a cobalt salt of methylolated DPBA and was dehydrated at a temperature up to 160° C. The properties of this resin were a flow of 48 mm., a gelation time of 45 seconds, and a softening point of 80° C.

This resin was employed to make a molding shell following the procedures of Example VI.

For comparison purposes, a reference molding shell designated Reference 1 was made from sand grains having the highest mechanical strength of all marketed sand grains, and substituting a conventional resin for the resin of the invention, but otherwise made according to the aforementioned Examples VI–XIV. A second reference molding shell designated Reference 2 was similarly made but employing sand grains having the fastest setting of all marketed sand grains, and therefore having inferior mechanical strength, in lieu of the sand grains of Reference 1. Comparative tests carried out to determine the properties of molding shells of Example VI–XIV and the molding shells of Reference 1 and Reference 2 were carried out and are tabulated in Table 4.

TABLE 4

| | Example | | | | | | | | | | |
|---|---|---|---|---|---|---|---|---|---|---|---|
| | 6 | 7 | 8 | 9 | 10 | 11 | 12 | 13 | 14 | Ref. 1 | Ref. 2 |
| Flexural strength (kg./cm.²) | 75 | 68 | 69 | 65 | 74 | 72 | 75 | 72 | 76 | 70 | 58 |
| Bend (mm.) | 0.20 | 0.15 | 0.14 | 0.61 | 0.21 | 0.24 | 0.16 | 0.18 | 0.20 | 1.50 | 0.50 |
| Peelback property (g.) | 2.63 | 2.48 | 2.40 | 2.20 | 2.58 | 2.51 | 2.60 | 2.61 | 2.65 | 1.80 | 2.01 |
| Block property (percent) | 10.5 | 13.0 | 14.2 | 20.3 | 11.6 | 15.2 | 18.0 | 12.1 | 20.2 | 67 | 48 |

The flexural strength values of Table 4 were determined in accordance with JIS K 6910 (dropping method and metal temperature 300° C.).

The bend data was obtained by applying a fixed load to the center of a plate shell which had been baked at 200° C., and the setting speed is evaluated by the bending degree of such shell (the smaller the value the faster the setting).

To determine the peelback property, a shell was molded in a plane metal mold of 100 mm. by 160 mm. with the metal mold set at 280° C. and a setting time of 50 seconds. The resultant shell was turned back and the weight of this shell excluding the portion which has been peelbacked is the peelback property (the smaller the value the higher the peelback property).

To determine the block property, immediately after sand mixing, a fixed amount of the mixture is placed into a polyethylene bag and left to stand for 24 hours. A cube weighing 300 grams is cut out of the portion of the mixture that has turned blockish, and this cube is subjected to sieving 5 times in a sieve of 20 meshes. The percent value of the sieving is the block property (the smaller the percent value of sieving, the better the block property).

From a consideration of Table 4, it is evident that products produced in accordance wtih this invention are far superior to the products of Reference 1 and 2 with respect to all of the test items.

The above-described comparative tests confirm that by practicing this invention it is possible to easily obtain an improved binder having remarkably improved properties such as grinding ability, dimensional stability, thermal resistance which are required of a whetstone, and storage stability, mechanical strength, setting speed and peelback property, which are required of a molding shell. The binders of the present invention are also useful for other applications, for example, as molding materials for other purposes.

While preferred embodiments of the invention have been shown and described, it will be appreciated that the invention is susceptible of various changes and modifications without departing from the scope and spirit of the invention, and it is intended to encompass all such changes and modifications as fall within the scope of the appended claims.

What is claimed is:

1. A composition comprising phenol formaldehyde resin and at least one diphenolic acid prepared in the presence of an acid catalyst in an amount sufficient to provide the composition with 0.5–30 mole percent of carboxyl groups based on the amount of benzene nuclei, said diphenolic acid component being selected from the group consisting of (1) a diphenolic acid having the formula:

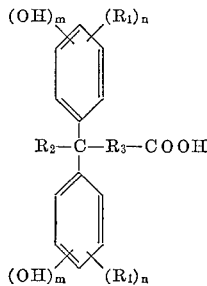

wherein each $m$ is an integer of 1–2, $R_1$ is at least one group selected from methylol, alkoxymethyl, lower alkyl having up to about 5 carbon atoms and hydrogen, $n$ is an integer of 0–2, $R_2$ is hydrogen or lower alkyl group having up to about 5 carbon atoms, and $R_3$ is an alkylene group having about 1 to 3 carbon atoms, (2) a metallic salt thereof, and (3) a mixture of said diphenolic acid and a metallic salt thereof the ratio of formaldehyde to phenol including both the phenol component and the diphenolic acid component ranging from about 0.5:1 to 4.0:1 on a mol basis.

2. A composition according to claim 1, wherein said diphenolic acid component is 4.4-bis (4'-hydroxyphenyl) pentanic acid.

3. A composition according to claim 1, wherein said diphenolic acid component is 4.4-bis (4'-hydroxyphenyl) butylic acid.

4. A composition according to claim 1, wherein said diphenolic acid component is 4.4-bis (2',4'-dihydroxyphenyl) butyric acid.

5. A composition according to claim 1, wherein said diphenolic acid component is 4.4-bis (2'-methyl, 4'-hydroxyphenyl) butyric acid.

6. A composition according to claim 1, wherein said diphenolic acid component is 4.4-bis (4'-hydroxyphenyl) pentanic acid derivatives.

7. A composition according to claim 1, wherein $R_2$ is hydrogen, and $R_3$ is —$CH_2CH_2$—.

8. A composition according to claim 1, wherein said diphenolic acid component is a metallic salt of a diphenolic acid.

9. A composition according to claim 8, wherein the metal in said metallic salt is selected from the group consisting of sodium, potassium, calcium, copper, zinc, iron, titanium, nickel and lead.

10. A composition according to claim 1, further comprising a filler of abrasive grains.

11. A whetstone made from the composition of claim 10.

12. A composition according to claim 1, further comprising sand as a filler.

13. A precision molding shell made of the composition of claim 12.

14. A precision molding chip(s) made of the composition of claim 1.

15. Precision molding powder made of the composition of claim 1.

16. A precision molding laminate made of the composition of claim 1.

17. A precision molding brake made of the composition of claim 1.

References Cited

UNITED STATES PATENTS 1,609,367  12/1926  Kulas et al. _____ 260—51
2,933,520   4/1960  Bader _____ 260—51

MORRIS LIEBMAN, Primary Examiner

S. M. PERSON, Assistant Examiner

U.S. Cl. X.R.

260—38, 57